A. H. LEEKER.
LOCKING DEVICE FOR AUTOMOBILES.
APPLICATION FILED JAN. 16, 1915.

1,140,383.

Patented May 25, 1915.

WITNESSES:
Adolph Mattui
Edw. Holinsig

INVENTOR.
Albert H. Leeker

UNITED STATES PATENT OFFICE.

ALBERT H. LEEKER, OF ST. BERNARD, OHIO.

LOCKING DEVICE FOR AUTOMOBILES.

1,140,383.    Specification of Letters Patent.    Patented May 25, 1915.

Application filed January 16, 1915. Serial No. 2,641.

*To all whom it may concern:*

Be it known that I, ALBERT H. LEEKER, a citizen of the United States, residing at St. Bernard, in the county of Hamilton and State of Ohio, have invented a new and useful Locking Device for Automobiles, of which the following is a specification.

My invention relates to the improvements in locking devices for automobiles applied to the gear shifting lever; and the objects of my improvements are, first, to provide a locking device applicable to any style of automobile; second, to so conceal the method of attachment, as to make the attaching elements difficult to be removed; and third, to provide a safe and reliable means of locking an automobile.

I attain the above mentioned objects by the mechanism illustrated in the accompanying drawing, in which—

Figure 1:
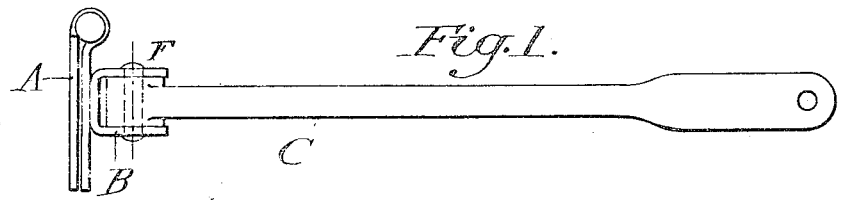
Figure 2:
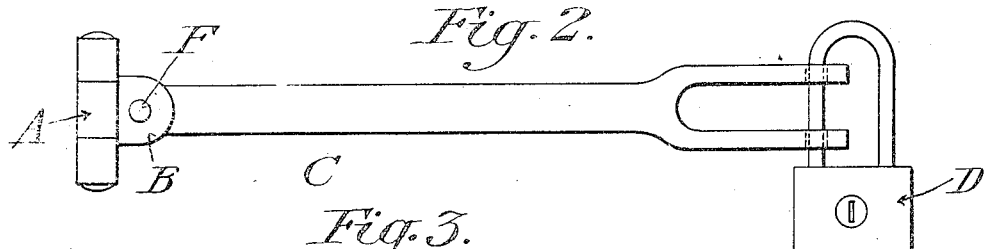
Figure 3:
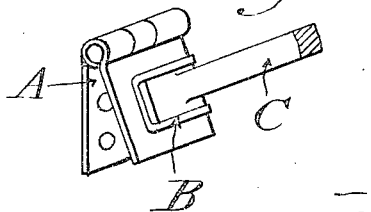
Figure 4:
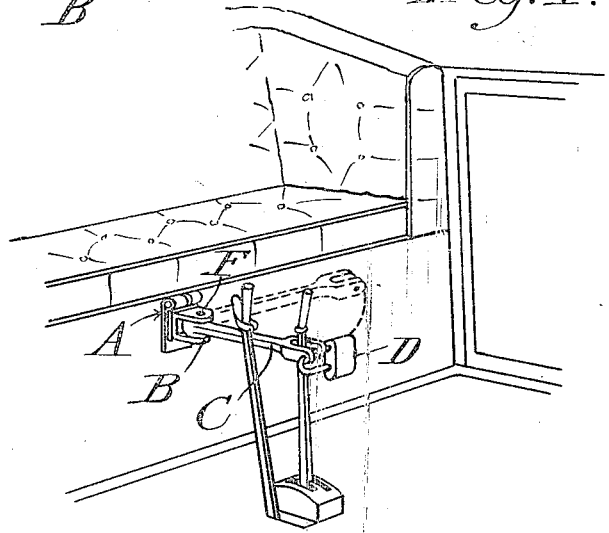

Figure 1—is a vertical section of device; Fig. 2—a top view of device; Fig. 3—a perspective view showing method of concealing screws used for attaching device to automobile; Fig. 4—a view of device attached to gear shifting lever.

Similar letters refer to similar parts throughout the several views.

The hinge A, bracket B, arm C, and lock D, constitute the four main parts of the locking device; the bracket B, is fastened to hinge A by means of three rivets; arm C is held to bracket B by means of a tight pin, this also allows the said arm C to be turned from side to side, and pin F acting as a pivot; arm C will vary in length according to the automobile on which it is to be used; the locking device is put into position ready for use by means of fastening same to back board under front seat, by means of four screws, and in direct line with gear shifting lever. When not in use same can be turned to one side on the pivot F as shown in Fig. 4 so as to be out of the way. The lock to be used if supplied by the inventor will be a pad lock suitable for the purpose; this however may vary according to the desires of owner of automobile on which the device is applied.

I am now aware that prior to my invention locking devices have been applied to gear shifting levers and therefore, I do not claim such combination broadly; but

I claim:

In a device for securing a lever, a base plate adapted to be secured to an element adjacent a lever by elements removable only from the surface thereof, a covering plate pivoted to said base plate at one edge thereof and of a size to cover said securing elements, an arm pivoted on said covering plate by a pivot whose axis intersects that of the axis of said first mentioned pivot, said arm having at a suitable location thereon remote from said second mentioned pivot, elements for interlocking engagement with a lever.

ALBERT H. LEEKER.

Witnesses:
ADOLPH MATHIS,
EDW. WOLINNG.